United States Patent
Rimboeck et al.

(10) Patent No.: US 11,643,330 B2
(45) Date of Patent: May 9, 2023

(54) METHOD FOR PRODUCING CHLOROSILANES

(71) Applicant: WACKER CHEMIE AG, Munich (DE)

(72) Inventors: Karl-Heinz Rimboeck, Heldenstein (DE); Karone Aseervatham, Burghausen (DE); Michael Mueller, Burghausen (DE); Natalia Sofina, Burghausen (DE)

(73) Assignee: WACKER CHEMIE AG, Munich (DE)

(*) Notice: Subject to any disclaimer, the term of this patent is extended or adjusted under 35 U.S.C. 154(b) by 64 days.

(21) Appl. No.: 16/753,941

(22) PCT Filed: Oct. 5, 2017

(86) PCT No.: PCT/EP2017/075420
§ 371 (c)(1),
(2) Date: Apr. 6, 2020

(87) PCT Pub. No.: WO2019/068335
PCT Pub. Date: Apr. 11, 2019

(65) Prior Publication Data
US 2020/0308008 A1    Oct. 1, 2020

(51) Int. Cl.
*C01B 33/107* (2006.01)
*C01B 33/021* (2006.01)
*B01J 8/18* (2006.01)

(52) U.S. Cl.
CPC ....... *C01B 33/10742* (2013.01); *B01J 8/1827* (2013.01); *C01B 33/021* (2013.01); *C01B 33/1071* (2013.01)

(58) Field of Classification Search
CPC ..... B01J 8/1809; B01J 8/1827; C01B 33/021; C01B 33/107; C01B 33/1071; C01B 33/10742
See application file for complete search history.

(56) References Cited

U.S. PATENT DOCUMENTS

| | | | | |
|---|---|---|---|---|
| 4,044,109 A | * | 8/1977 | Kotzsch | C01B 33/04 423/342 |
| 2004/0047793 A1 | | 3/2004 | Mleczko et al. | |

(Continued)

FOREIGN PATENT DOCUMENTS

| CN | 102753478 A | 10/2012 |
|---|---|---|
| CN | 104229477 A | 12/2014 |

(Continued)

OTHER PUBLICATIONS

Feng Zhang et al., Effect of Gas Distributor on Hydrodynamics and the Rochow Reaction in a Fluidized Bed Membrane Reactor, Industrial & Engineering Chemistry Research, Sep. 19, 2016, vol. 55, No. 40, pp. 10600-10608, ISSN 0888-5885, XP055324939, United States.

*Primary Examiner* — Ngoc-Yen Nguyen
(74) *Attorney, Agent, or Firm* — Brooks Kushman P.C.

(57) ABSTRACT

Chlorosilanes are produced in exalted yield in a fluidized bed process when the reactor hydraulic diameter, Sauter particle diameter, and superficial gas velocity are used to define a parameter space as a function of Reynolds number and Archimedes number.

23 Claims, 5 Drawing Sheets

(56) References Cited

U.S. PATENT DOCUMENTS

| | | | |
|---|---|---|---|
| 2010/0111804 A1* | 5/2010 | Lord | B01J 8/1827 |
| | | | 423/342 |
| 2010/0264362 A1* | 10/2010 | Chee | B01J 8/0055 |
| | | | 252/182.1 |
| 2011/0229398 A1 | 9/2011 | Troll et al. | |
| 2012/0301385 A1 | 11/2012 | Akiyoshi et al. | |
| 2014/0369771 A1 | 12/2014 | Mautner et al. | |
| 2015/0329366 A1* | 11/2015 | Chew | C01B 33/021 |
| | | | 423/348 |
| 2017/0120210 A1 | 5/2017 | Weckesser | |

FOREIGN PATENT DOCUMENTS

| | | |
|---|---|---|
| WO | 0248024 A2 | 6/2002 |
| WO | 2010028878 A1 | 3/2010 |
| WO | 2015140028 A1 | 9/2015 |
| WO | 2016198264 A1 | 12/2016 |

* cited by examiner

METHOD FOR PRODUCING CHLOROSILANES

CROSS REFERENCE TO RELATED APPLICATIONS

This application is the U.S. National Phase of PCT Appln. No. PCT/EP2017/075420 filed Oct. 5, 2017, the disclosure of which is incorporated in its entirety by reference herein.

BACKGROUND OF THE INVENTION

1. Field of the Invention

The invention relates to a process for preparing chlorosilanes in a fluidized-bed reactor by reaction of a reaction gas with a silicon-containing particulate contact composition, wherein the hydraulic diameter of the fluidized-bed reactor $d_{hyd}$, the superficial velocity of the gas in the fluidized-bed reactor $u_L$ and the Sauter diameter of the particulate contact composition $d_{32}$ are chosen in a targeted manner.

2. Description of the Related Art

The production of polycrystalline silicon as a starting material for the manufacture of chips or solar cells is usually carried out by decomposition of volatile halogen compounds thereof, in particular trichlorosilane (TCS, $HSiCl_3$).

Polycrystalline silicon can be produced in the form of rods by means of the Siemens process in which polycrystalline silicon is deposited on heated filament rods in a reactor. A mixture of TCS and hydrogen is usually employed as process gas. As an alternative, granular polycrystalline silicon can be produced in a fluidized-bed reactor. Here, silicon particles are fluidized in a fluidized bed by means of a gas stream, with heating of the bed to high temperatures being effected by means of a heating device. Introduction of a silicon-containing reaction gas such as TCS results in a pyrolysis reaction of the hot particle surfaces, as a result of which the diameter of the particles increases.

The preparation of chlorosilanes, in particular TCS, can be carried out by essentially three processes which are based on the following reactions (cf. WO2010/028878A1 and WO2016/198264A1):

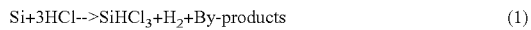
(1)

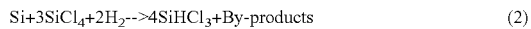
(2)

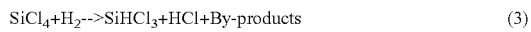
(3)

By-products obtained can be further halosilanes, for example monochlorosilane ($H_3SiCl$), dichlorosilane ($H_2SiCl_2$), silicon tetrachloride (STC, $SiCl_4$) and also disilanes and oligosilanes. Furthermore, impurities such as hydrocarbons, organochlorosilanes and metal chlorides can be constituents of the by-products. In order to produce high-purity TCS, a distillation is therefore usually carried out subsequently.

In the hydrochlorination as per reaction (1), chlorosilanes can be prepared in a fluidized-bed reactor from metallurgical silicon with addition of hydrogen chloride (HCl), with the reaction proceeding exothermally. This generally gives TCS and STC as main products.

A further possible way of preparing TCS is thermal converting of STC and hydrogen in the gas phase in the presence or absence of a catalyst.

The low-temperature converting as per reaction (2) is carried out in the presence of a catalyst (e.g. copper-containing catalysts or catalyst mixtures). The low-temperature converting can be carried out in a fluidized-bed reactor in the presence of metallurgical silicon at temperatures in the range from 400° C. to 700° C.

The high-temperature converting as per reaction (3) is an endothermic process. This process usually takes place in a reactor under high pressure at temperatures in the range from 600 to 900° C.

The known processes are fundamentally complicated and energy-intensive. In particular, the hydrochlorination and the low-temperature converting proceed at relatively high temperatures and pressures in the fluidized-bed reactor. The required energy input, which is generally brought about electrically, represents a considerable cost factor. Furthermore, it is necessary for a continuous process to introduce the starting components of silicon and hydrogen chloride (HCl) or silicon, STC and hydrogen into the reactor under reaction conditions, which is associated with a considerable engineering outlay. In the light of this background, it is important to realize a very high productivity, namely the amount of chlorosilanes formed per unit time and reaction volume, and a very high selectivity based on the desired target product (usually TCS).

It was therefore an object of the present invention to provide a highly economical process for preparing chlorosilanes.

SUMMARY OF THE INVENTION

These and other objects are achieved by a first process for preparing chlorosilanes, in particular TCS, in a fluidized-bed reactor by reaction of an HCl-containing reaction gas with a particulate contact composition containing silicon and optionally a catalyst, wherein the chlorosilanes have the general formula $H_nSiCl_{4-n}$, and/or $H_mCl_{6-m}Si_2$ where n=1-4 and m=0-4. The first process is, in particular, a hydrochlorination which is described by the reaction equation (1).

The objects of the invention are likewise achieved by a second process for preparing chlorosilanes in a fluidized-bed reactor by reaction of a reaction gas containing silicon tetrachloride (STC) and hydrogen with a particulate contact composition containing silicon and a catalyst, wherein the chlorosilanes have the general formula $H_nSiCl_{4-n}$, and/or $H_mCl_{6-m}Si_2$ where n=1-4 and m=0-4. This second process is, in particular, low-temperature converting described by the reaction equation (2).

DETAILED DESCRIPTION OF THE PREFERRED EMBODIMENTS

Figure 1:
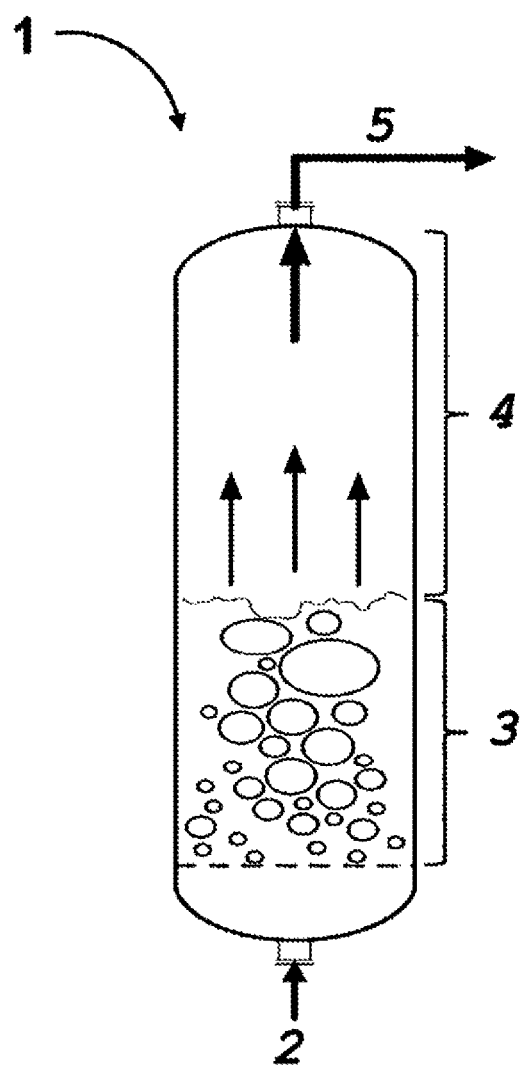
FIG. 1 is a fluidized-bed reactor 1 for carrying out the process of the invention.

In the first process of the invention, the hydraulic diameter of the fluidized-bed reactor $d_{hyd}$, the superficial velocity of the gas in the fluidized-bed reactor $u_L$ and the Sauter diameter of the particulate contact composition $d_{32}$ are selected so that points are imaged on an area in which the Archimedes number Ar is plotted against the Reynolds number Re in a cartesian coordinate system, where the area is defined by the equations 1a and 1b:

$$Ar = 3 \cdot 10^{-3} \cdot Re^2 \cdot 8.18 \cdot Re + 1200 \quad (1a)$$

$$Ar = 4 \cdot 10^{-6} \cdot Re^2 \cdot 0.69 \cdot Re + 14400 \quad (1b)$$

with a lower limit Ar=1 and an upper limit Ar=3000.

The dimensionless Archimedes number Ar is determined by means of the equation 3:

$$Ar = g \cdot \frac{d_{32}^3}{v_F^2} \cdot \frac{\rho_P - \rho_F}{\rho_F}, \quad (3)$$

where
g is the acceleration due to gravity [m/s$^2$],
$d_{32}$ is the Sauter diameter of the particles [m],
$\rho_P$ is the solids density of the particles [kg/m$^3$],
$\rho_F$ is the fluid density [kg/m$^3$] and
$v_F$ is the kinematic viscosity of the fluid [m2/s].

The dimensionless Reynolds number Re is determined by means of the equation 4:

$$Re = \frac{u_L \cdot d_{hyd}}{v_F}, \quad (4)$$

where
$u_L$ is the superficial velocity of the gas [m/s] and
$d_{hyd}$ is the hydraulic diameter [m].

The hydraulic diameter dh$_y$d is determined by means of the equation 5:

$$d_{hyd} = \frac{4 * A_{q,free}}{U_{total,wetted}}, \quad (5)$$

where $A_{q,\,free}$ corresponds to the free flow cross section [m$^2$] in the fluidized-bed reactor and $U_{total,\,wetted}$ corresponds to the wetted perimeter [m] of all internals in the fluidized-bed reactor.

It has been found that optimal ranges for the preparation of chlorosilanes are given by a particular combination and selection of structural features (internals), of the particle size of the particulate contact composition and of the operating conditions in the fluidized-bed reactor. The productivity of the process is particularly high within these ranges.

FIG. 1 shows a fluidized-bed reactor 1 for carrying out the process of the invention. The reaction gas 2 is preferably blown in from the bottom and optionally from the side (e.g. tangentially or orthogonally to the gas stream from the bottom) into the particulate contact composition, as a result of which the particles of the contact composition are fluidized and form a fluidized bed 3. In general, the fluidized bed 3 is heated by means of a heating device (not shown) arranged outside the reactor in order to start the reaction. During continuous operation, no heating is usually necessary. Part of the particles is transported with the gas stream from the fluidized bed 3 into the free space 4 above the fluidized bed 3. The free space 4 is characterized by a very low solids density, with this decreasing in the direction of the reactor outlet. The proportion of particles which leaves the reactor with the gas stream is referred to as particle discharge 5.

Studies on the fluid dynamics in fluidized-bed reactors have indicated that the geometry of the interior space of the fluidized-bed reactor has a critical influence on the fluid dynamics and thus also the productivity. For the present purpose, the interior space is the region which can come into contact with the reaction gas and/or the particles of the contact composition (i.e., for example, both the free space and also the region in which the fluidized bed is formed). The geometry of the interior space is generally determined not only by general structural features such as height, width, shape (e.g. cylinder or cone) but also by internals present in the interior space. Internals can be, in particular, heat exchanger units, stiffening plates, feed conduits for introduction of the reaction gas and devices for distributing the reaction gas (e.g. gas distributor plates).

The geometry of the interior space of the reactor has an effect firstly on the residence time of the reaction gas, in particular of HCl, in the fluidized-bed reactor and secondly on the discharge of particles of the contact composition from the fluidized-bed reactor.

Thus, it has been found that the higher the residence time and the more homogeneous the distribution of the reaction gas in the interior space of the reactor, the more HCl is reacted. An increase in productivity of the fluidized-bed reactor is associated therewith. In principle, the ascending gas bubbles are slowed with increasing surface area of the internals, as a result of which the residence time of the gas increases.

Furthermore, it has been found that the discharge of contact composition particles from the fluidized-bed reactor, which occurs as a result of "entrainment" of the particles in the gas stream, is dependent on the particle size, the fill height in the fluidized-bed reactor, the amount of reaction gas continuously fed in (gas velocity), the system pressure and also the reactor internals. The fill height essentially represents the center of gravity of the fluidized bed and is dependent on the particle size distribution of the particles (fine particles tend to correspond to a large, coarse rather than small extension of the fluidized bed around the center of gravity).

The productivity of the fluidized-bed reactor increases in principle with increasing fill height, with increasing gas velocity and with decreasing particle size of the contact composition particles (larger reaction surface area).

Apart from the influence of the internals on the residence time of the reaction gas, there is likewise a relationship between the internals and the discharge of contact composition particles. The discharge is influenced by two mechanisms. Firstly, the gas bubbles are slowed with increasing surface area of the internals, so that fewer particles are flung out from the fluidized bed. Secondly, relatively large particles in particular are slowed in the free space due to a relatively large surface area of the internals and are thus kept in the fluidized bed. The productivity of the fluidized-bed reactor can therefore be increased by targeted alterations of the internals, an increase in the gas velocity and/or an increase in the fill height or a reduction in the particle size.

The relationship between these parameters, which exert a mutual influence on one another, can be indicated by means of dimensionless characteristic numbers. On this basis, working ranges in which chlorosilanes can be prepared particularly economically in fluidized-bed reactors are defined.

The relationship between the surface area of the internals, expressed by the hydraulic plant diameter $d_{hyd}$, and the operating parameters superficial velocity of the gas $u_L$ and Sauter diameter $d_{32}$ of the contact composition particles can be represented in a cartesian coordinate system by means of the two dimensionless characteristic numbers Archimedes number Ar and Reynolds number Re.

The Archimedes number Ar determined by means of equation 3 describes the influence of the Sauter diameter of the contact composition particles on the fluid dynamics in fluidized-bed reactors. The Sauter diameter corresponds to the average, volume-equivalent particle diameter of the particles of the contact composition.

The Reynolds number Re determined by means of equation 4 contains the superficial velocity of the gas $u_L$ in the fluidized-bed reactor and thus the amount of reaction gas introduced. Re indicates a relationship between $u_L$ and the hydraulic plant diameter $d_{hyd}$ in the fluidized-bed reactor, with the wetted perimeter of all internals going into $d_{hyd}$ in equation 5.

The Reynolds number Re can be kept constant when the gas velocity (superficial velocity of the gas) and thus the volume flow of reaction gas is increased at a constant, free flow cross section (reactor cross section) and at the same time the hydraulic plant diameter $d_{hyd}$ is decreased by increasing the surface area of the internals. The volume flow can be determined by means of a flow meter (e.g. float flow meter) in the feed conduit for reaction gas to the reactor.

On the basis of the relationships found, it is possible to define with the aid of the dimensionless characteristic numbers Ar and Re a working range in which the chlorosilanes can be prepared particularly economically.

This working range corresponds to an area in a cartesian coordinate system in which Ar is plotted against Re which is defined for the first process by the equations 1a and 1b with a lower limit Ar=1 and an upper limit Ar=3000.

Figure 2:
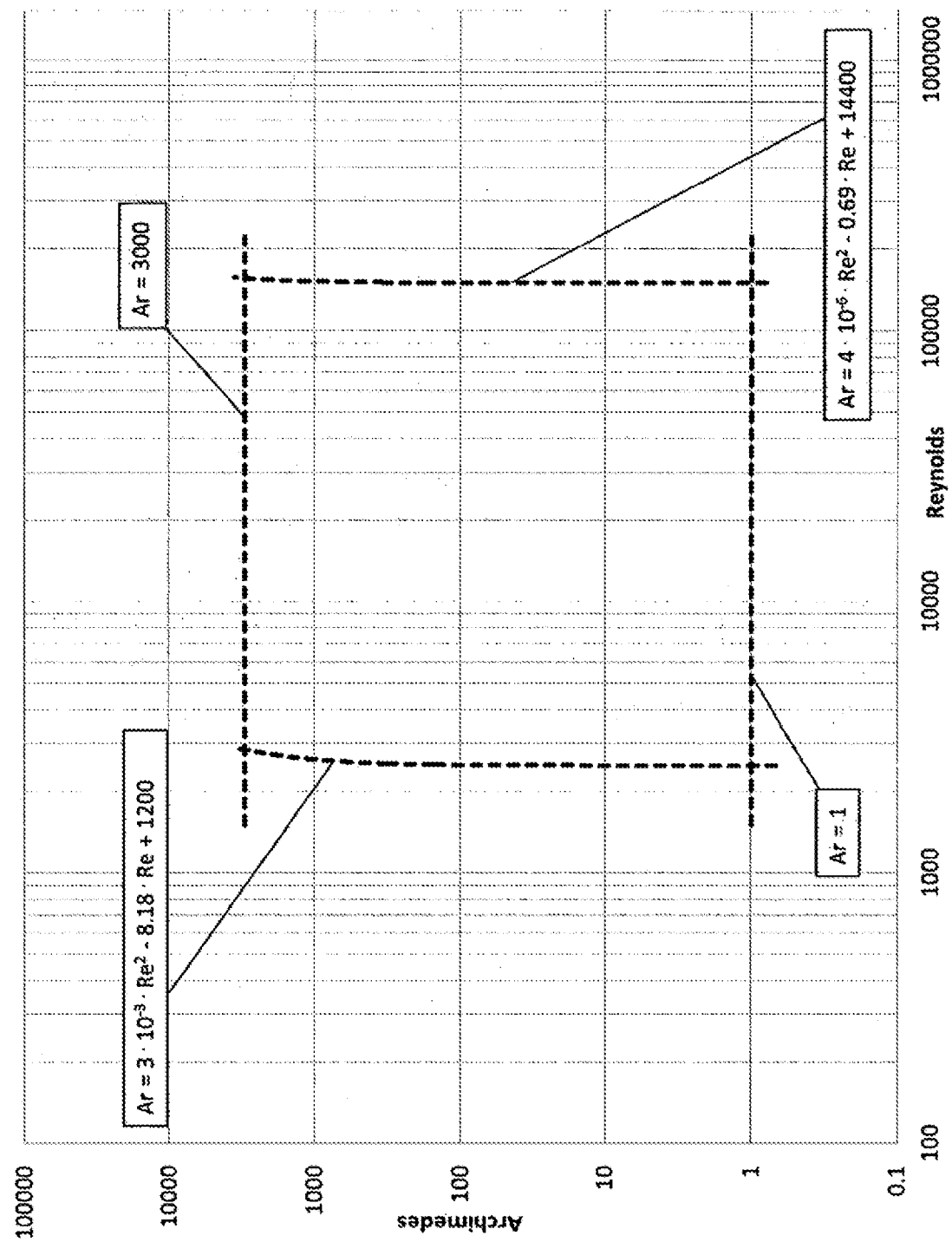
FIG. 2 illustrates a working range for production of chlorosilanes for a first embodiment of the invention.

This working range is depicted in FIG. 2 for the first process according to the invention.

Regarding the dimensionless characteristic numbers:

The dimensionless Archimedes number Ar can be interpreted as ratio between buoyancy and frictional force and serves to characterize the behavior of different particle sizes (in the present case of the contact composition) in fluidized beds.

The flow state of a fluid can be described with the aid of the dimensionless Reynolds number Re. The Reynolds number can be interpreted as the ratio of inertia to viscous force. The hydraulic reactor or plant diameter $d_{hyd}$ is used as characteristic length required for the definition of the Reynolds number and the relationship to the internals in the interior of the reactor is thus established.

The hydraulic plant diameter in the fluidized-bed reactor $d_{hyd}$ [m] is an engineering characteristic number by means of which flow-mechanical frictional and surface effects of internals, channels or deviating geometries can be described by assigning these to an equivalent tube diameter. The hydraulic diameter $d_{hyd}$ is calculated by means of equation 5, where $A_{q,\,free}$ corresponds to the free flow cross section [m$^2$] and $U_{total,\,wetted}$ corresponds to the wetted perimeter [m] of all internals in the fluidized-bed reactor.

The internal diameter of the fluidized-bed reactor and the external diameter of the internals can, for example, be measured by means of laser measurements/3D scans (e.g. ZEISS COMET L3D 2).

In a preferred embodiment of the first process, the hydraulic plant diameter in the fluidized-bed reactor $d_{hyd}$ is from 0.7 to 1.8 m, preferably from 0.8 to 1.7 m, more preferably from 0.9 to 1.6 m.

Preference is also given to the superficial velocity of the gas $u_L$ being from 0.05 to 4 m/s, preferably from 0.06 to 3 m/s, more preferably from 0.07 to 2 m/s.

The Sauter diameter $d_{32}$ of the particulate contact composition is preferably from 5 to 500 μm, more preferably from 10 to 480 μm, and in particular from 15 to 450 μm.

The determination of the particle size distribution or of the Sauter diameter $d_{32}$ can be carried out in accordance with ISO 13320 (laser light scattering) and/or ISO 13322 (image analysis). A calculation of average particle sizes/diameters from particle size distributions can be carried out in accordance with DIN ISO 9276-2.

The contact composition is preferably a mixture of silicon particles. In particular, the particles are particles of silicon which preferably contain not more than 5% by weight, more preferably not more than 2% by weight, and in particular not more than 1% by weight, of other elements as impurities. Preference is given to using particles composed of metallurgical silicon (mgSi) which usually has a purity of from 98% to 99.9%. A typical composition is, for example, one containing 98% of silicon, with the remaining 2% generally being made up to a major part of the following elements: Fe, Ca, Al, Ti, Cu, Mn, Cr, V, Ni, Mg, B, C, P and O. Furthermore, the following elements can be present: Co, W, Mo, As, Sb, Bi, S, Se, Te, Zr, Ge, Sn, Pb, Zn, Cd, Sr, Ba, Y and Cl.

The abovementioned elements present as impurities in the silicon have a catalytic activity. For this reason, the addition of a catalyst is in principle not necessary in the first process. However, the process can be positively influenced, especially with respect to its selectivity, by the presence of additional catalysts.

The catalyst can be, in particular, one or more elements from the group consisting of Fe, Cr, Ni, Co, Mn, W, Mo, V, P, As, Sb, Bi, O, S, Se, Te, Ti, Zr, C, Ge, Sn, Pb, Cu, Zn, Cd, Mg, Ca, Sr, Ba, B, Al, Y, Cl. The catalyst is preferably selected from the group consisting of Fe, Al, Ca, Ni, Mn, Cu, Zn, Sn, C, V, Ti, Cr, B, P, O and mixtures thereof. As mentioned above, these catalytically active elements are already present as impurities in a particular proportion in silicon, for example in oxidic or metallic form, as silicides or in other metallurgical phases. The proportion thereof depends on the purity of the silicon used.

In principle, no further catalyst is necessary when using mgSi or silicon of relatively low purity.

The use of a catalyst in the first process is advisable when, in particular, high-purity silicon having a purity of >99.99% is used, since the proportion of catalytically active compounds is then too low. The contact composition can in this case contain, in order to provide additional catalytically active elements, particles of mgSi, for example in a proportion of up to 50% by weight, preferably 60% by weight, more preferably 70% by weight, and in particular 80% by weight, in addition to particles of high-purity silicon. However, catalysts can also be added in metallic or alloyed or salt-like form to the contact composition. Such a form of catalyst can be, in particular, chlorides and/or oxides of the catalytically active elements. Preferred compounds are CuCl, CuCl$_2$, CuO or mixtures thereof.

The contact composition can additionally contain promoters, for example Zn and/or zinc chloride.

The reaction gas preferably contains at least 50% by volume, more preferably at least 70% by volume, and most preferably at least 90% by volume, of HCl. Apart from HCl, the reaction gas can additionally contain one or more components selected from the group consisting of $H_2$, $H_nSiCl_{4-n}$ (n=0-4), $H_mCl_{6-m}Si_2$ (m=0-6), $H_qCl_{6-q}Si_2O$ (q=0-4), $CH_4$, $C_2H_6$, CO, $CO_2$, $O_2$, and/or $N_2$.

These components can, for example, originate from HCl recovered in an integrated facility.

The reaction gas can additionally contain a carrier gas, for example nitrogen or a noble gas such as argon.

Furthermore, hydrogen can be added to the reaction gas, particularly in order to influence the equilibrium position of the reaction. Hydrogen can also be present as an impurity in recovered HCl.

The determination of the composition of the reaction gas is usually carried out by means of Raman and infrared spectroscopy and also gas chromatography before introduction into the reactor. This can be carried out either by means of samples taken in a random manner and subsequent "off-line analyses" or by means of "on-line" analytical instruments integrated into the system.

The absolute pressure in the fluidized-bed reactor in which the first process of the invention is preferably carried out is from 0.1 to 1 MPa, preferably from 0.13 to 0.7 MPa, more preferably from 0.15 to 0.5 MPa.

The first process is preferably carried out in a temperature range from 280 to 400° C., more preferably from 320 to 380° C., and in particular from 340 to 360° C.

In the second process of the invention, too, the hydraulic diameter of the fluidized-bed reactor $d_{hyd}$, the superficial velocity of the gas in the fluidized-bed reactor $u_L$ and the Sauter diameter of the particulate contact composition $d_{32}$ are selected so that points are imaged on an area in which the Archimedes number Ar is plotted against the Reynolds number Re in a cartesian coordinate system, where the area is defined by the equations 2a and 2b:

$$Ar = 5 \cdot 10^{-9} \cdot Re^2 + 4.8 \cdot 10^{-3} \cdot Re - 102 \quad (2a)$$

$$Ar = 1 \cdot 10^{-9} \cdot Re^2 - 1.1 \cdot 10^{-2} \cdot Re + 10774 \quad (2b)$$

with a lower limit Ar=0.3 and an upper limit Ar=3000.

As regards the definitions of Ar and Re, reference may be made to the information given above. The same applies with respect to the relationships between $d_{hyd}$, $d_{32}$ and $u_L$, which can be derived by means of the dimensionless characteristic numbers Ar and Re.

For the second process, too, a working range in which the chlorosilanes can be prepared particularly economically can be defined by means of the characteristic numbers Ar and Re.

This working range corresponds to an area in a cartesian coordinate system in which Ar is plotted against Re which for the second process is defined by the equations 2a and 2b with a lower limit Ar=0.3 and an upper limit Ar=3000.

Figure 3:
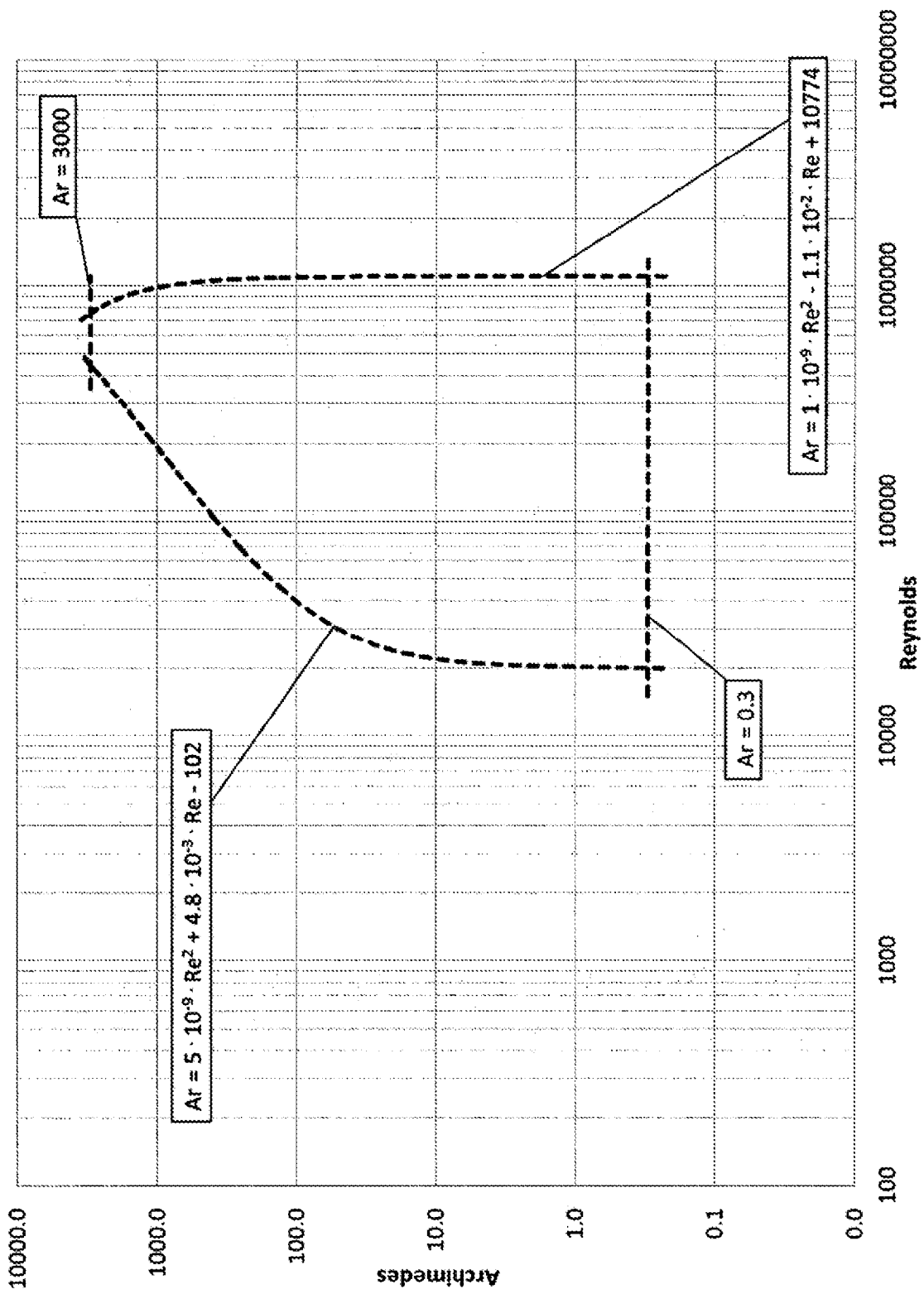
FIG. 3 illustrates a working range for the production of chlorosilanes for a second embodiments of the invention.

For the second process of the invention, this working range is depicted in FIG. 3.

The second process can likewise be carried out in a fluidized-bed reactor as described in FIG. 1.

In contrast to the first process of the invention, the contact composition is reacted with STC and hydrogen, and it is absolutely necessary to add a catalyst. Here, HCl is firstly formed by a reaction between STC and hydrogen and this HCl then reacts further with the silicon-containing contact composition to form chlorosilanes of the general formulae indicated above. Here, HCl is produced in situ and not introduced directly into the reactor as in the first process.

The chlorosilanes prepared using the two processes according to the invention are preferably monochlorosilane, dichlorosilane and/or TCS, in particular TCS. Disilanes which are preferably prepared are $Si_2Cl_6$ and/or $HSi_2Cl_5$, in particular $Si_2Cl_6$.

In a preferred embodiment of the second process, the hydraulic plant diameter in the fluidized-bed reactor $d_{hyd}$ is from 0.1 to 24 m, preferably from 0.15 to 10 m, more preferably from 0.2 to 5 m.

Furthermore, preference is given to the superficial velocity of the gas $u_L$ being from 0.05 to 0.6 m/s, preferably from 0.055 to 0.55 m/s, more preferably from 0.06 to 0.5 m/s.

The Sauter diameter $d_{32}$ of the particulate contact composition is, exactly as in the first process, preferably from 5 to 500 µm, more preferably from 10 to 480 µm, and in particular from 15 to 450 µm.

As regards the properties of the contact composition, reference may be made to the information given with respect to the first process.

With respect to the type of catalyst, too, reference may be made to the information given above. However, in the case of the second process, the proportion of catalytically active elements usually present in the silicon used (corresponding to the purity of the silicon) is not sufficient, so that a catalyst has to be added to the contact composition, as a function of the purity of the silicon used. The catalyst is preferably composed of chlorides and/or oxides of the catalytically active metals/elements. Preferred compounds are CuCl, $CuCl_2$, and CuO.

The catalyst is preferably present in a proportion of from 0.1 to 20% by weight, more preferably from 0.5 to 15% by weight, yet more preferably from 0.8 to 10% by weight, and in particular from 1 to 5% by weight, based on silicon, in the contact composition.

In a preferred embodiment of the second process, the reaction gas contains at least 50% by volume, more preferably at least 60% by volume, and most preferably at least 70% by volume, of hydrogen and STC.

Hydrogen and STC are preferably present in a molar ratio of from 1:1 to 10:1, more preferably from 1:1 to 6:1, and most preferably from 1:1 to 4:1.

In a further embodiment of the second process, the reaction gas can contain HCl and/or $Cl_2$. An exothermic reaction can be made possible thereby, which is associated with a decreasing energy consumption. In particular, from 0.01 to 1 mol of HCl and/or from 0.01 to 1 mol of $Cl_2$ can be present per mol of hydrogen present in the reaction gas.

If the reaction gas contains HCl in addition to hydrogen and STC, it is in principle possible to carry out the process without the presence of an additional catalyst. For example, even high-purity silicon (purity>99.99%) can be reacted in this way without an additional catalyst. This is generally not possible in the first process of the invention, since the latter is generally carried out at lower temperatures.

Furthermore, the reaction gas can contain one or more components selected from the group consisting of $H_nSiCl_{4-n}$ (n=0-4), $H_mCl_{6-m}Si_2$ (m=0-6), $H_qCl_{6-p}Si_2O$ (q=0-4), $CH_4$, $C_2H_6$, CO, $CO_2$, $O_2$, $N_2$. These components can, for example, originate from hydrogen recovered in an integrated facility.

The second process is preferably carried out at an absolute pressure in the fluidized-bed reactor of from 0.2 to 4 MPa, more preferably from 0.3 to 3 MPa, and most preferably from 0.5 to 2.5 MPa.

The temperature range in which the second process is preferably carried out is from 350 to 850° C., more preferably from 400 to 750° C., and in particular from 500 to 700° C.

The above-described processes are preferably integrated into an integrated facility for producing polycrystalline silicon. The integrated facility preferably encompasses the following processes: production of TCS by means of the first or second process according to the invention, purification of the TCS produced to given TCS of semiconductor quality, deposition of polycrystalline silicon, preferably by the Siemens process or as granular material, recycling of the STC obtained in the production of the polycrystalline silicon, preferably by use of the second process or recycling of the STC by feeding it back into the production of TCS as per reaction equation (3) (high-temperature converting).

EXAMPLES

Experiments in Pilot Plant Reactors

Pilot plant reactors are relatively small-scale reactors. The pressure in these reactors was 0.10 MPa (absolute) and the temperature was 20° C. The fluidized bed behavior is mainly influenced by particle size, particle size distribution, gas velocity and flow cross section.

The above-described relationship between the internals, particle sizes and particle discharge was firstly confirmed without chemical reaction in a pilot plant fluidized bed. It was found here that there is an exponential relationship between the hydraulic reactor or plant diameter $d_{hyd}$ and particle discharge. This relationship was measured and confirmed for various internals and particle size distributions.

Increasing the productivity of fluidized-bed reactors by decreasing the hydraulic diameter $d_{hyd}$ in existing reactors:

The particle discharge from the reactor is firstly reduced by decreasing the hydraulic plant diameter $d_{hyd}$ (by means of additional sheet-like internals and heat exchanger tubes). The gas velocity can be increased by means of the latitude with respect to particle discharge which has been gained in this way. Thus, the productivity increases in the working ranges defined by the equations 1a, 1b and 2a, 2b.

Increasing the productivity of existing fluidized-bed reactors by reducing the Sauter diameter $d_{32}$ of the silicon particles introduced:

A smaller Sauter diameter $d_{32}$ results in a greater particle discharge from the reactor. This can in turn be decreased by reducing the hydraulic plant diameter $d_{hyd}$, so that a more productive particle size fraction having a greater surface area (smaller $d_{32}$) can be used. Silicon losses are reduced in this way.

Design of New Fluidized-Bed Reactors

On the basis of the abovementioned knowledge, it is possible to match new synthesis reactors optimally with respect to dimensioning, internals and operational settings, to a particular contact composition particle size. Optimal combinations of these parameters are located in the indicated area (working range) as per FIG. 2 (first process) and 3 (second process).

Experiments Under Production Condition

In order to apply the knowledge and relationships obtained to the productivity in the preparation of chlorosilanes and define the abovementioned limits of the influencing variables (working ranges), comprehensive studies were carried out on continuously operated fluidized-bed reactors of various sizes.

For both processes (first process: hydrochlorination and second process: low-temperature converting), various experiments V were carried out (table 1: V1 to V22 for hydrochlorination and table 2: V1 to V19 for low-temperature converting), with the hydraulic plant diameter $d_{hyd}$ being varied in the range from 0.7 m to 1.8 m (hydrochlorination) or from 0.1 m to 24 m (low-temperature converting), the superficial velocity of the gas $u_L$ being varied in the range from 0.05 m/s to 4 m/s (hydrochlorination) or from 0.05 m/s to 0.6 m/s (low-temperature converting) and the Sauter diameter of the particles $d_{32}$ being varied in the range from 5 µm to 500 µm (hydrochlorination and low-temperature converting). In general, the particle solids density pp can be considered to be approximately constant. The fluid density $\rho_F$ and the kinematic viscosity $v_F$ can be determined by simulations of (phase) equilibrium states using process engineering software. These simulations are usually based on adapted equations of state which in the case of varying physical parameters (e.g. p and T) are based on actually measured compositions of the reaction mixture both in the gas phase and in the liquid phase. This simulation model can be validated by means of actual operating states/parameters and thus makes it possible to determine operating optima in respect of the parameters $\rho_F$ and $v_F$.

The determination of phase equilibria can, for example, be carried out using a measuring apparatus (e.g. modified circulation apparatus as described by Röck and Sieg, for example MSK Baraton model 690, MSK Instruments). Here, changes in the state of matter were brought about in a mixture of materials by variation of physical influencing parameters such as pressure and temperature. The various states of matter were subsequently analyzed and the component composition was determined, for example using a gas chromatograph. Computer aided modeling makes it possible to adapt the equations of state in order to describe the phase equilibria. The data are transferred into process engineering software programs, so that phase equilibria can be calculated.

The viscosity is a measure of the transfer of momentum perpendicular to the flow direction in a moving fluid. Here, the kinematic viscosity $v_F$ can be described via the dynamic viscosity and the fluid density. The density can in the case of liquids be approximated by means of, for example, the Rackett equation, and in the case of gases an approximation can be obtained via an equation of state, e.g. Peng-Robinson. The measurement of the density can be carried out by means of a digital density measuring instrument (e.g. DMA 58, from Anton Paar) using the bending oscillator method (resonant frequency measurement).

The fluid density $\rho_F$ is usually in the range from 1.5 to 5 kg/m$^3$. The kinematic viscosity $v_F$ is usually in the range from $3 \cdot 10^{-6}$ to $2.5 \cdot 10^{-3}$ m$^2$/s.

The Archimedes number Ar and the Reynolds number Re were obtained from the selected parameters $d_{hyd}$, $u_L$ and $d_{32}$. To evaluate the selected combinations of Re and Ar, the productivity [kg/(kg*h)], i.e. the amount of chlorosilanes produced per hour [kg/h], based on the amount of contact composition [kg] used in the reactor, was used as basis. For both processes, a productivity of >0.01 kg/(kg*h) is considered to be optimum or acceptable.

Figure 4:
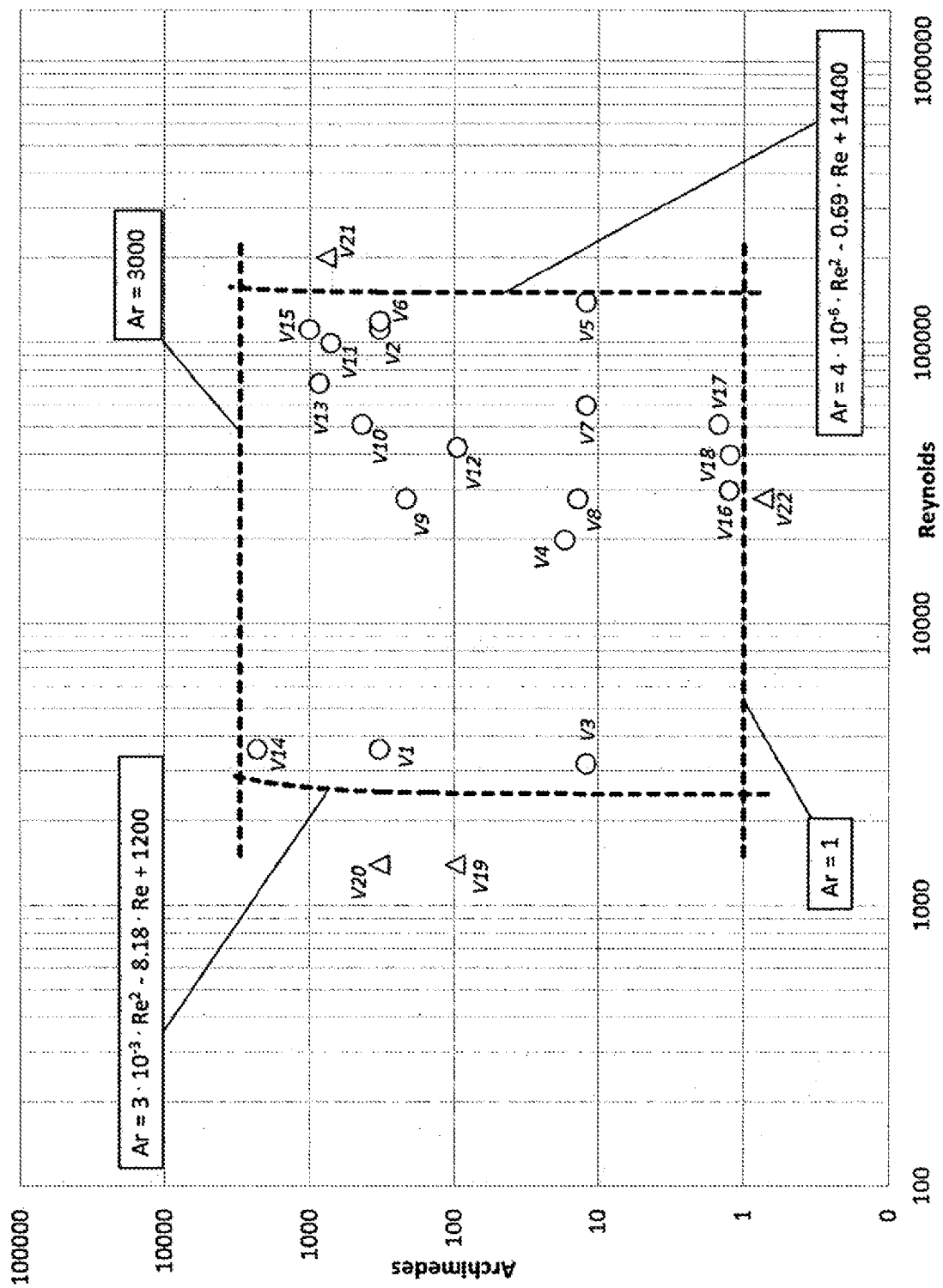
FIG. 4 depicts a plot of experimental Ar and Re values plotted against each other for a hydrochlorination process.

The results for hydrochlorination are shown in table 1, and those for low-temperature converting are shown in table 2. In the graphs of FIG. 4 (hydrochlorination) and 5 (low-temperature converting), the numerical values for Re determined in the experiments V are plotted against the numerical values determined for Ar as per tables 1 and 2.

The circles in FIG. 4 (hydrochlorination) denote experiments V1-V18 which led to a productivity of more than 0.01 kg/(kg*h). The measurement results depicted as triangles denote the experiments V19-V22 which led to a productivity of less than 0.01 kg/(kg*h).

Figure 5:
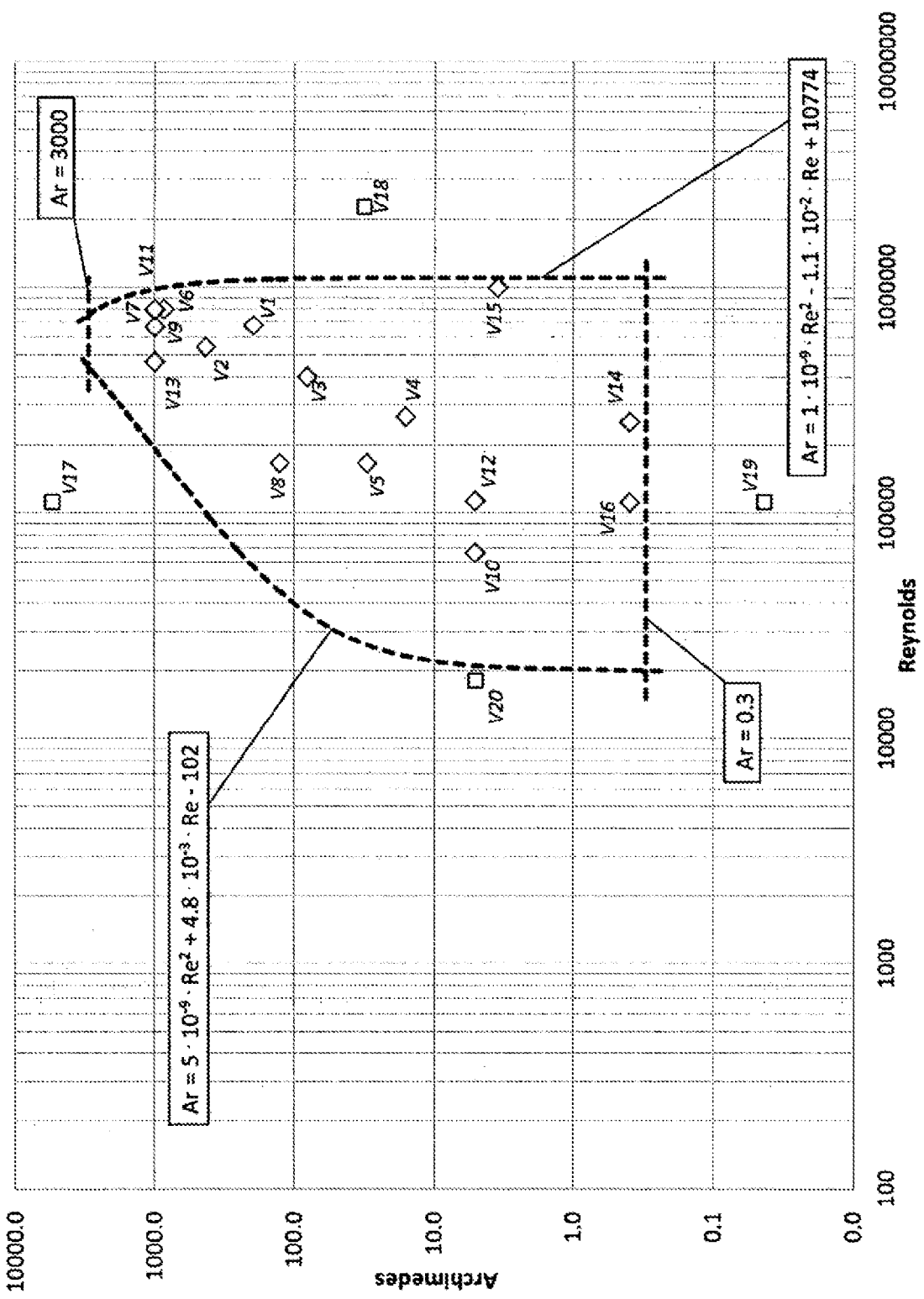
FIG. 5 depicts a plot of experimental Ar and Re values plotted against each other for a low temperature conversion process.

Analogously, the diamonds in FIG. 5 (low-temperature converting) denote the experiments V1-V16 which led to a productivity of more than 0.01 kg/(kg*h) and the squares denote the experiments V17-V20 which led to a productivity of less than 0.01 kg/(kg*h).

The working ranges, which are also shown in FIGS. 2 and 3, were established with the aid of these experiments.

TABLE 1

Hydrochlorination (first process)

| Exp. | Re | Ar | Productivity [kg/(kg*h)] |
| --- | --- | --- | --- |
| V1 | 3600 | 329 | 0.065 |
| V2 | 112000 | 329 | 0.053 |
| V3 | 3200 | 12 | 0.035 |
| V4 | 20000 | 17 | 0.41 |
| V5 | 140000 | 12 | 0.15 |
| V6 | 120000 | 328.7 | 0.051 |
| V7 | 60000 | 12 | 0.23 |
| V8 | 28000 | 14 | 0.35 |
| V9 | 28000 | 215 | 0.53 |
| V10 | 51429 | 439 | 0.62 |
| V11 | 100000 | 716 | 0.04 |
| V12 | 42667 | 95 | 0.25 |
| V13 | 72000 | 859 | 0.06 |
| V14 | 3600 | 2284 | 0.039 |
| V15 | 112000 | 1014 | 0.032 |
| V16 | 30000 | 1.24 | 0.017 |
| V17 | 51429 | 1.49 | 0.015 |
| V18 | 40000 | 1.24 | 0.016 |
| V19 | 1400 | 97 | <0.01 |
| V20 | 1400 | 329 | <0.01 |
| V21 | 200000 | 770.8 | <0.01 |
| V22 | 28000 | 0.73 | <0.01 |

TABLE 2

Low-temperature converting (second process)

| Exp. | Re | Ar | Productivity [kg/(kg*h)] |
| --- | --- | --- | --- |
| V1 | 680000 | 195 | 0.1 |
| V2 | 544000 | 429 | 0.13 |
| V3 | 400000 | 80 | 0.39 |
| V4 | 266667 | 16 | 0.22 |
| V5 | 166667 | 30 | 0.33 |
| V6 | 800000 | 851 | 0.044 |
| V7 | 793333 | 993 | 0.055 |
| V8 | 166667 | 126 | 0.44 |
| V9 | 666667 | 993 | 0.066 |
| V10 | 66667 | 5 | 0.11 |
| V11 | 800000 | 993 | 0.033 |
| V12 | 113333 | 5 | 0.165 |
| V13 | 466667 | 993 | 0.013 |
| V14 | 251852 | 0.39 | 0.011 |
| V15 | 1000000 | 3.50 | 0.011 |
| V16 | 111111 | 0.39 | 0.012 |
| V17 | 111111 | 5401 | <0.01 |
| V18 | 2266667 | 32 | <0.01 |
| V19 | 111111 | 0.04321 | <0.01 |
| V20 | 18133 | 5 | <0.01 |

The range limit for low Reynolds numbers Re (equations 1a and 2a) is characterized in that combinations of low superficial velocity of gas $u_L$ and/or a very low hydraulic reactor diameter $d_{hyd}$ ($d_{hyd}$ about 0.7 for hydrochlorination and 0.1 for low-temperature converting) lead to a decreasing productivity. The productivity also decreases with increasing Sauter diameter of the particles $d_{32}$ (and thus greater Ar), since higher gas velocities are required for fluidization in the case of coarser particles of the contact composition.

This can be seen from the course of the curves (equations 1a and 2a, FIGS. 4 and 5).

The range limit for high Reynolds numbers Re (equations 1b and 2b) is characterized by very high superficial velocities of the gas $u_L$, so that, for example, the particle discharge can no longer be compensated by modification of the hydraulic diameter of the reactor $d_{hyd}$. Here too, it can be seen that a comparatively wider range for Re can be given for relatively coarse particles (large Ar and $d_{32}$), since, for example, the particle discharge has an adverse effect on the productivity only at a combination of relatively high superficial velocity of the gas $u_L$ and hydraulic reactor diameter $d_{hyd}$.

The lower limits of the working range (cf. FIG. 4: hydrochlorination and 5: low-temperature converting) at Ar=1 and Ar=0.3, respectively, (very fine particles, i.e. small $d_{32}$) result firstly from the particle discharge due to a reduction in the hydraulic plant diameter $d_{hyd}$ no longer being able to be compensated for sufficiently by variation of $u_L$. This results in uneconomical plant operation. Secondly, the limits of effective fluidization of the contact composition are reached at Ar<1 or Ar<0.3, so that the productivity decreases because of reduced contact between contact composition and reaction gas.

The upper limit of Ar=3000 and above corresponds to relatively coarse particles (large $d_{32}$) which firstly require a comparatively high fluidization velocity (superficial velocity of gas) and secondly go outside the economical range of high productivity because of the lower specific particle surface area.

The invention claimed is:

1. A process for preparing chlorosilanes in a fluidized-bed reactor, comprising:
A) reacting a particulate contact composition containing silicon and optionally a catalyst with an HCl-containing fluidizing gas, wherein the chlorosilanes have the formula $H_nSiCl_{4-n}$ and/or $H_mCl_{6-m}Si_2$ where n=1-3 and m=0-4 and the hydraulic diameter of the fluidized-bed reactor $d_{hyd}$, the superficial velocity $u_L$ of the HCl-containing fluidizing gas in the fluidized-bed reactor, and the Sauter diameter of the particulate contact composition $d_{32}$, are selected so that reactor conditions represented by Ar and Re lie in an area in which when the Archimedes number Ar is plotted against the Reynolds number Re in a cartesian coordinate system, the area is defined by the equations 1a and 1b $$Ar = 3 \cdot 10^{-3} \cdot Re^2 - 8.18 \cdot Re + 1200 \tag{1a}$$

$$Ar = 4 \cdot 10^{-6} \cdot Re^2 - 0.69 \cdot Re + 14400 \tag{1b}$$

with a lower limit Ar=1 and an upper limit Ar=3000, where Ar is determined by means of equation 3

$$Ar = g \cdot \frac{d_{32}^3}{v_F^2} \cdot \frac{\rho_P - \rho_F}{\rho_F} \tag{3}$$

and g is the acceleration due to gravity [m/s²],
$d_{32}$ is the Sauter diameter of the particles [m],
$\rho_P$ is the solids density of the particles [kg/m³],
$\rho_F$ is the fluid density of the, HCl-containing fluidizing gas [kg/m³],
$v_F$ is the fluid kinematic viscosity of the HCl-containing fluidizing gas [m²/s], where Re is determined by means of equation 4

$$Re = \frac{u_L \cdot d_{hyd}}{v_F} \quad (4)$$

and
$u_L$ is the superficial velocity of the HCl-containing fluidizing gas [m/s] and
$d_{hyd}$ is the hydraulic diameter [m],
where $d_{hyd}$ is determined by means of equation 5

$$d_{hyd} = \frac{4 * A_{q,free}}{U_{total,wetted}} \quad (5)$$

and
$A_{q,\,free}$ corresponds to the free flow cross section [m²] in the fluidized-bed reactor and
$U_{total,\,wetted}$ corresponds to the wetted perimeter [m] of all internals in the fluidized-bed reactor, or
  B) reacting a fluidizing gas containing silicon tetrachloride and hydrogen with a particulate contact composition containing silicon and a catalyst, wherein the chlorosilanes have the formula $H_nSiCl_{4-n}$ and/or $H_mCl_{6-m}Si_2$ where n=1-3 and m=0-4 and
  the hydraulic diameter of the fluidized-bed reactor $d_{hyd}$, the superficial velocity $u_L$ of the fluidizing gas containing silicon tetrachloride and hydrogen in the fluidized-bed reactor, and the Sauter diameter of the particulate contact composition $d_{32}$ are selected so that the reactor conditions represented by Ar and Re, lie in an area in which when the Archimedes number Ar is plotted against the Reynolds number Re in a cartesian coordinate system, the area is defined by the equations 2a and 2b:

$$Ar = 5 \cdot 10^{-9} \cdot Re^2 + 4.8 \cdot 10^{-3} \cdot Re - 102 \quad (2a)$$

$$Ar = 1 \cdot 10^{-9} \cdot Re^2 - 1.1 \cdot 10^{-2} \cdot Re + 10774 \quad (2b)$$

with a lower limit Ar=0.3 and an upper limit Ar=3000, where Ar is determined by means of equation 3

$$Ar = g \cdot \frac{d_{32}^3}{v_F^2} \cdot \frac{\rho_P - \rho_F}{\rho_F} \quad (3)$$

and
g is the acceleration due to gravity [m/s²],
$d_{32}$ is the Sauter diameter of the particles [m],
$\rho_P$ is the solids density of the particles [kg/m³],
$\rho_F$ is the density of the fluidizing gas [kg/m³], and
$v_F$ is the kinematic viscosity of the fluidizing gas [m²/s],
where Re is determined by means of equation 4

$$Re = \frac{u_L \cdot d_{hyd}}{v_F} \quad (4)$$

and
$u_L$ is the superficial velocity of the gas [m/s] and
$d_{hyd}$ is the hydraulic diameter [m], where $d_{hyd}$ is determined by means of equation 5

$$d_{hyd} = \frac{4 * A_{q,free}}{U_{total,wetted}} \quad (5)$$

and
$A_{q,\,free}$ corresponds to the free flow cross section [m²] in the fluidized-bed reactor, and
$U_{total,\,wetted}$ corresponds to the wetted perimeter [m] of all internals in the fluidized-bed reactor.

2. The process of claim 1, wherein process A) is used.

3. The process of claim 2, wherein $d_{hyd}$ is from 0.7 to 1.8 m.

4. The process of claim 2, wherein $u_L$ is from 0.05 to 4 m/s.

5. The process of claim 4, wherein $u_L$ is from 0.06 to 3 m/s.

6. The process of claim 4, wherein $u_L$ is from 0.07 to 2 m/s.

7. The process of claim 2, wherein the HCl-containing reaction gas contains at least 50% by volume of hydrogen chloride.

8. The process of claim 2, wherein the HCl-containing reaction gas contains at least 70% by volume of hydrogen chloride.

9. The process of claim 2, wherein the absolute pressure in the fluidized-bed reactor is from 0.1 to 1 MPa.

10. The process of claim 2, wherein the absolute pressure in the fluidized-bed reactor is from 0.13 to 0.7 MPa.

11. The process of claim 1, wherein process (B) is used.

12. The process of claim 11, wherein $d_{hyd}$ is from 0.1 to 24 m.

13. The process of claim 11, wherein $d_{hyd}$ is from 0.15 to 10 m.

14. The process of claim 11, wherein $u_L$ is from 0.05 to 0.6 m/s.

15. The process of claim 11, wherein $u_L$ is from 0.055 to 0.55 m/s.

16. The process of claim 11, wherein the reaction gas containing silicon tetrachloride and hydrogen contains at least 50% by volume of hydrogen and silicon tetrachloride.

17. The process of claim 11, wherein the reaction gas containing silicon tetrachloride and hydrogen contains at least 60% by volume of hydrogen and silicon tetrachloride.

18. The process of claim 11, wherein hydrogen and silicon tetrachloride are present in the reaction gas containing silicon tetrachloride and hydrogen in a molar ratio of from 1:1 to 10:1.

19. The process of claim 11, wherein the absolute pressure in the fluidized-bed reactor is from 0.2 to 4 MPa.

20. The process of claim 1, wherein the catalyst is selected from the group consisting of Fe, Al, Ca, Ni, Mn, Cu, Zn, Sn, C, V, Ti, Cr, B, P, O and mixtures thereof.

21. The process of claim 1, wherein the catalyst is present in a proportion of from 0.1 to 20% by weight.

22. The process of claim 1, wherein $d_{32}$ is from 5 to 500 μm.

23. The process of claim 1, wherein the process is integrated into an integrated facility for producing polycrystalline silicon.

* * * * *